(No Model.)
E. CAHILL.
GATE.
No. 493,477. Patented Mar. 14, 1893.
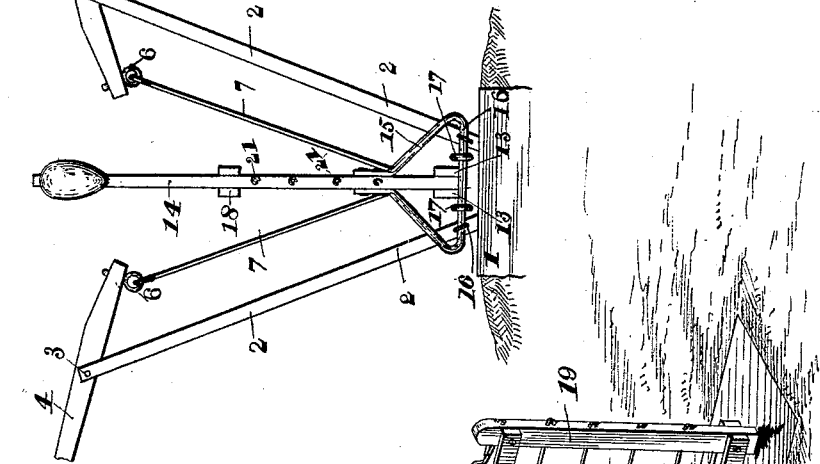
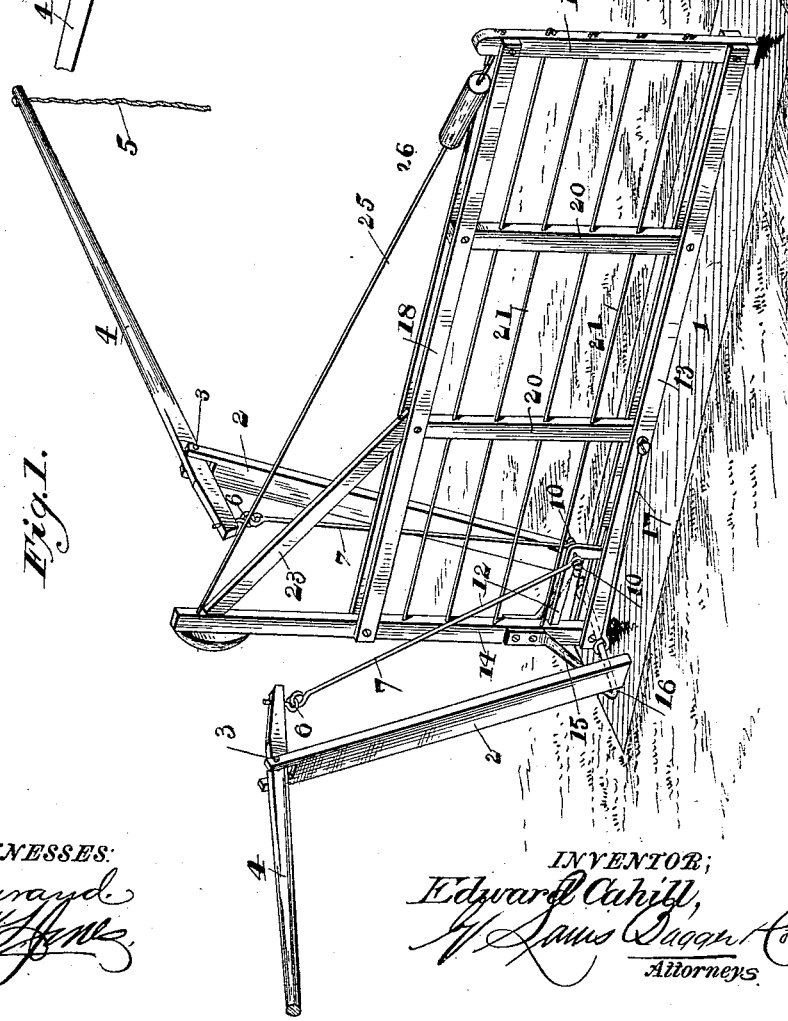
WITNESSES:
F. L. Ourand
[signature]
INVENTOR:
Edward Cahill,
[signature]
Attorneys

UNITED STATES PATENT OFFICE.

EDWARD CAHILL, OF EMMETSBURG, IOWA.

GATE.

SPECIFICATION forming part of Letters Patent No. 493,477, dated March 14, 1893.

Application filed January 11, 1893. Serial No. 458,074. (No model.)

*To all whom it may concern:*

Be it known that I, EDWARD CAHILL, a citizen of the United States, and a resident of Emmetsburg, in the county of Palo Alto and State of Iowa, have invented certain new and useful Improvements in Gates; and I do hereby declare that the following is a full, clear, and exact description of the invention, which will enable others skilled in the art to which it appertains to make and use the same, reference being had to the accompanying drawings, which form a part of this specification.

My invention relates to improvements in pivoted or swinging gates, provided with means for actuating the same, whereby the gate can be opened or closed without the operator's alighting from a vehicle or dismounting from a horse which he may be riding.

The invention consists in the novel construction and combination of parts, hereinafter fully described and claimed.

In the accompanying drawings: Figure 1 is a perspective view of a gate constructed in accordance with my invention. Fig. 2 is a rear end view of the same.

In the said drawings, the reference numeral 1 designates a base consisting of a board or joist, which extends across the gate opening. Near its rear end, this base is provided with two outwardly inclined uprights or standards 2, formed with lugs 3 at their upper ends to which are pivoted the outwardly extending levers 4, provided with ropes 5 at their outer ends. At their inner ends these levers are provided with eye-bolts 6, with which are connected downwardly extending rods 7, pivoted to lugs 10 on an angular bar 12, secured to the bottom rails 13 and rear end bar 14, of the gate. Also secured to said end bar is a bail 15, the horizontal arm 16 of which is pivoted to the lower ends of the uprights 2.

The numeral 17 designates brace bars pivoted to the said bail at their rear ends and secured to the side bottom rails 13 at their front ends.

The numeral 18 designates the top rails, 19 the front end bar, and 20 and 21, the intermediate vertical and horizontal rails or rods.

It will be noted that the end bar 14 extends up above the top rails 18 and is braced by an inclined bar 23, secured thereto and to said rails. Secured to this end bar and inclined bar, is a rod 25, which passes through an aperture in a sliding counterbalance-weight 26.

The operation will be readily understood: A person desiring to open the gate gives a quick pull upon one of the ropes 5, which through the medium of the lever with which it is connected and the angular bar 12, causes the gate to be swung upon its pivot, the weight 26 sliding toward the rear end aiding in throwing the bar 12 past the dead center. A similar pull upon the same rope, or the rope of the opposite lever, will close the gate.

Having thus described my invention, what I claim is—

The combination of the uprights, the levers pivoted thereto, the downwardly extending rods pivotally connected with said levers, the gate having end bars and top and bottom rails, the angular bar to which said levers are pivoted, secured to the rear end bar and bottom rails of the gate, the bail secured to said end bar and pivoted to the uprights, and the inclined rod, and sliding counterbalance-weight, substantially as described.

In testimony that I claim the foregoing as my own I have hereunto affixed my signature in presence of two witnesses.

EDWARD CAHILL.

Witnesses:
E. A. MORLING,
THOMAS MCLAUGHN.